United States Patent
Krishna et al.

(10) Patent No.: US 7,505,990 B2
(45) Date of Patent: Mar. 17, 2009

(54) METHOD FOR DEFINING AND GENERATING DOCUMENT MANAGEMENT APPLICATIONS FOR MODEL-DRIVEN DOCUMENT MANAGEMENT

(75) Inventors: Vikas Krishna, San Jose, CA (US); Savitha Srinivasan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 11/123,735

(22) Filed: May 5, 2005

(65) Prior Publication Data

US 2006/0253490 A1 Nov. 9, 2006

(51) Int. Cl.
G06F 7/00 (2006.01)
G06F 17/00 (2006.01)

(52) U.S. Cl. ............... 707/102; 707/104.1; 707/10
(58) Field of Classification Search ............. 707/1–206; 703/21, 22; 709/200
See application file for complete search history.

(56) References Cited

U.S. PATENT DOCUMENTS

| | | | |
|---|---|---|---|
| 5,734,887 A * | 3/1998 | Kingberg et al. ............... 707/4 |
| 6,051,029 A * | 4/2000 | Paterson et al. ............... 703/22 |
| 6,401,091 B1 * | 6/2002 | Butler et al. .................. 707/10 |
| 6,421,691 B1 * | 7/2002 | Kajitani ...................... 715/500 |
| 6,571,246 B1 * | 5/2003 | Anderson et al. ............. 707/10 |
| 6,789,252 B1 * | 9/2004 | Burke et al. ................. 717/100 |
| 6,850,950 B1 | 2/2005 | Clarke et al. |
| 6,973,626 B1 * | 12/2005 | Lahti et al. ................... 715/763 |
| 7,031,901 B2 * | 4/2006 | Abu El Ata ................... 703/21 |
| 7,062,500 B1 * | 6/2006 | Hall et al. .................... 707/102 |
| 7,072,934 B2 * | 7/2006 | Helgeson et al. ............. 709/203 |
| 7,089,248 B1 * | 8/2006 | King et al. .................... 707/10 |
| 7,089,583 B2 * | 8/2006 | Mehra et al. ................... 726/3 |
| 7,143,347 B2 * | 11/2006 | Su ............................... 715/520 |
| 7,149,734 B2 * | 12/2006 | Carlson et al. ................ 707/6 |
| 7,152,228 B2 * | 12/2006 | Goodwin et al. ............. 717/146 |
| 7,181,493 B2 * | 2/2007 | English et al. ............... 709/204 |
| 7,272,817 B1 * | 9/2007 | Hinkle et al. ............... 717/104 |
| 2002/0030853 A1 * | 3/2002 | Kizaki et al. ............... 358/1.16 |
| 2003/0009507 A1 * | 1/2003 | Shum ........................... 709/104 |
| 2003/0227487 A1 * | 12/2003 | Hugh ........................... 345/777 |

(Continued)

OTHER PUBLICATIONS

Chul-Ki Nama, Gil-Sang Jangb and Jae-Hak J. Bae, An XML-based active document for intelligent web applications, Mar. 26, 2003, Expert Systems with Applications 25 (2003) 165-176.*

(Continued)

*Primary Examiner*—Mohammad Ali
*Assistant Examiner*—Angelica Ruiz
(74) *Attorney, Agent, or Firm*—Samuel A. Kassatly; Shimokaji & Associates, PC

(57) ABSTRACT

A business process file generator defining and generating dynamic document management applications for use in a document management system, formalizing variable elements in document management applications to reduce the requirement for custom application logic with each new application. The business process file generator captures and externalizes variable aspects of a document management application such that each new instance of a model of a document contains only those elements that are relevant to the application. The business process file generator supports the instantiation of a model for each new application and generates runtime artifacts associated with a specific model. The runtime artifacts comprise code, XML configurations, scripts, and business logic.

10 Claims, 7 Drawing Sheets

U.S. PATENT DOCUMENTS

| | | |
|---|---|---|
| 2004/0027388 A1* | 2/2004 | Berg et al. .................. 345/781 |
| 2004/0107183 A1 | 6/2004 | Mangan |
| 2004/0133876 A1* | 7/2004 | Sproule ...................... 717/105 |
| 2004/0176968 A1* | 9/2004 | Syed et al. ..................... 705/1 |
| 2004/0205580 A1 | 10/2004 | De Angelis et al. |
| 2004/0243459 A1* | 12/2004 | Geritz et al. .................. 705/10 |
| 2004/0267813 A1* | 12/2004 | Rivers-Moore et al. .. 707/104.1 |
| 2005/0132070 A1* | 6/2005 | Redlich et al. .............. 709/228 |
| 2005/0137885 A1* | 6/2005 | Nohgawa et al. ............... 705/1 |
| 2005/0154699 A1* | 7/2005 | Lipkin et al. ................... 707/1 |
| 2005/0216827 A1* | 9/2005 | Mochizuki .................. 715/511 |
| 2006/0010032 A1* | 1/2006 | Eicher et al. ................. 705/10 |
| 2006/0020641 A1* | 1/2006 | Walsh et al. ................ 707/203 |
| 2006/0047525 A1* | 3/2006 | Ziv et al. ....................... 705/1 |
| 2006/0053158 A1* | 3/2006 | Hall et al. ................... 707/102 |
| 2006/0088214 A1* | 4/2006 | Handley et al. ............. 382/176 |
| 2006/0190544 A1* | 8/2006 | Chikirivao et al. .......... 709/206 |
| 2006/0195494 A1* | 8/2006 | Dietrich ...................... 708/110 |
| 2006/0212855 A1* | 9/2006 | Bournas et al. ............. 717/140 |
| 2006/0225032 A1* | 10/2006 | Klerk et al. ................. 717/105 |
| 2006/0253490 A1* | 11/2006 | Krishna et al. ........... 707/104.1 |

OTHER PUBLICATIONS

ProQuest Information and Learning—0735614954—Microsoft® Computer Dictionary, 2002, Microsoft Press, Fifth Edition, p. 379.*

Lyman, Peter, et al., "How Much Information, 2000", available at http://www.sims.berkeley.edu/how-much-info.

* cited by examiner

FIG. 7

METHOD FOR DEFINING AND GENERATING DOCUMENT MANAGEMENT APPLICATIONS FOR MODEL-DRIVEN DOCUMENT MANAGEMENT

CROSS-REFERENCE TO RELATED APPLICATION

This application is related to co-pending U.S. patent application titled "System and Method for Automatically and Dynamically Composing Document Management Applications", Ser. No. 10/980,716, which was filed on Nov. 3, 2004, which is assigned to the same assignee as the present application, and which is incorporated herein by reference.

FIELD OF THE INVENTION

The present invention generally relates to content management. More specifically, the present system pertains to a content management application that applies relevant document analysis, metadata extraction, and business process association algorithms and methodology to automatically and dynamically classify documents for routing, processing, and executing customized business logic. In particular, the present system pertains to a method for generating dynamic document management applications for use in the content management application.

BACKGROUND OF THE INVENTION

Content management is defined as software that builds, organizes, manages, and stores collections of digital works in any medium or format. Content management refers to the process of handling various types of structured and unstructured information, including images and documents that may contain billing data, customer service information, or other types of content. Content management further refers to the process of capturing, storing, sorting, codifying, integrating, updating, and protecting any and all information. Studies estimate that more than 75% of enterprise data is unstructured and document-related (reference is made for example, to Lyman, Peter, et. al., "How Much Information, 2000", http://www.sims.berkelev.edu/how-much-info).

Key technologies in the content management market include document management, web content management, digital asset management, and records management. Typical users of content management are in document-heavy industries in which document management is essential, often for regulatory or compliance reasons. Content comprises many different forms of unstructured data requiring management: business documents, dynamic web content, records management, and rich media. Business documents comprise contracts, invoices, forms, and e-mail. Business documents, for example, facilitate internal back-office processes and enable direct external communication with customers, partners, and suppliers. Dynamic web content comprises business data in relational databases and personalized information. Records management is typically driven by government and industry regulations to effectively document processes, audit trails, and data retention. Rich media comprises digital audio and video. Rich media is rapidly transforming areas of training, education, marketing, and customer relationship management in many industries.

Conventional document management applications are typically built on top of a document repository. Documents are typically indexed, ingested, and stored in the document repository to support query and retrieval. Indexing and any logic associated with the inbound and outbound document flow are hard coded as application specific logic. Examples of such application specific logic include e-mail notifications that accompany an inbound claims document, the addition of specific marketing collateral associated with invoice documents, etc.

The notion of relating document management with workflow has been prevalent for several decades and many document management systems incorporate this feature. One conventional method presents a tool that supports gathering together documents, adding metadata, and building new collections of libraries (reference is made to Bainbridge, D., et. al., "Assembling and Enriching Digital Library Collections", In Proceedings of The Join Conference on Digital Libraries, 2003). The process of this conventional method involves selecting a document for inclusion, generating a suitable metadata set, assigning metadata to each document or group of documents, and designing the form of the collection in terms of document formats, searchable indexes, and browsing facilities. The process further involves building the necessary indexes and data structures and putting the collection in place for others to use. The tool of this conventional method is specific to a particular digital library but lends itself to more general contexts in the underlying ideas of this conventional approach.

Another conventional method utilizes a workflow language named exchangeable routing language (XRL) for supporting cross-organizational processes (reference is made to van der Aalst, W. M. P, et. al., "XRL/Woflan: Verification and Extensibility of an XML/Petri-net Based Language for Inter-organizational Workflows", In Proceedings of the 6$^{th}$ INFORMS Conference on Information Systems and Technology, 2001). XRL also uses XML for the representation of process definitions and Petri nets for semantics purposes. XRL is instance-based; consequently, workflow definitions can be changed "on the fly" and sent across organizational boundaries. Although this technology has proven to be useful, it would be desirable to present additional improvements. The features of XRL make cross-organizational workflows susceptible to errors.

This conventional method also uses XRL/Woflan, a software tool using Petri-net analysis techniques for verifying XRL workflows. This tool uses extensible style language transformations (XLST) to translate SRL specifications to a specific class of Petri nets called workflow nets. The Petri-net representation is used to determine whether the workflow is correct. If the workflow is not correct, anomalies such as deadlocks and livelocks are reported.

Another conventional approach utilizes a systematic layered modeling approach (reference is made to Sadiq, W., "On Capturing Process Requirements of Workflow Based Business Information Systems", In Proceedings of the 3$^{rd}$ International Conference on Business Information Systems, 1999). This approach splits workflow specification into five basic dimensions: structure, data, execution, temporal, and transactional and introduces a graphical language for workflow modeling.

Yet another conventional method presents tools and methods to address problems in integrated document and workflow management with a case study involving offer processing for a machine tool company (reference is made to Morschheuser, S., et. al., "Integrated document and workflow management applied to the offer processing of a machine tool company", In Proceedings of Conference on Organizational Computing Systems, 1995). This conventional method is a process definition language designed to make a document-oriented tool with a workflow engine more efficient.

Another conventional approach utilizes an idea of active document properties to document management applications (reference is made to Dourish, P., et al., "Extending document management systems with user-specific active properties", In ACM Transactions on Information Systems (TOIS), Volume 18 Issue 2, 2000). This conventional approach avoids traditional hierarchical storage mechanisms, reflects document categorizations meaningful to user tasks, and provides a means to integrate the perspectives of one or more individuals within a uniform interaction framework. Property-based document management systems are augmented with the notion of active properties that carry executable code to enable the provision of document-based services on a property infrastructure.

Yet another conventional system captures essentially freely structured documents such as those typically used in the office domain (reference is made to Mattos, N. M., et. al., "An approach to integrated office document processing and management", In ACM SIGOIS Bulletin, Proceedings of the Conference on Office Information Systems, Volume 11 Issue 2-3, 1990). This conventional system facilitates the handling of containing information. Analyzed documents are stored in a document management system that is connected to several different subsequent services and serves as rudimentary workflow.

A further conventional system uses the Eclipse platform to create customized perspectives and views. The Eclipse platform provides a stable, full-featured base layer on which custom tools can be created. An information visualization tool has been integrated within this platform. A plug-in has also been developed for this platform for providing a visual integrated development environment for JasCo, a dynamic language focused at component-based software engineering to guide developers in programming JasCo artifacts using visual wizards.

Much of the research related to model-driven development has been performed in the context of easing runtime aspects of user-database interactions such as query expression, query result display, and navigation through the stored data. Collectively, these tasks are referenced as Visual Query Systems. In comparison, relatively little focus has been placed on the interface provided by the tools used to define and manipulate models for data and applications. Conventional database modeling products provide visual data modeling profiles that integrate into a broader software development cycle.

The lifestyle of conventional document management applications typically comprises a set of loosely coupled subsystems that provide capture, index, search, workflow, fulfillment, and archival features. However, there currently exists no standard model or platform for composing these elements together to instantiate a compete application. Consequently, each application incorporates custom application code to provide linkages between each of the loosely coupled subsystems.

What is therefore needed is a system, a computer program product, and an associated method for defining and generating dynamic document management applications for use in a document management system. The need for such a solution has heretofore remained unsatisfied.

SUMMARY OF THE INVENTION

The present invention satisfies this need, and presents a system, a computer program product, and an associated method (collectively referred to herein as "the system" or "the present system") for defining and generating dynamic document management applications for use in a content management system. The present system formalizes variable elements in content management applications to reduce the requirement for custom application logic with each new application. The present system captures and externalizes variable aspects of a document management application such that each new instance of a model contains only those elements that are relevant to the application. The present system supports the instantiation of a model for each new application. The present system generates runtime artifacts associated with a specific model. The runtime artifacts comprise code, XML configurations, scripts, and business logic.

With the present system, a user directly manipulates one or more data model elements to model a required document management application, generating a business process file. The business process file comprises a structured data model that includes business process information in the form of metadata. Business process information comprises, for example, repository information for storing a document, data to be extracted from the document, etc. The business process file comprises, for example, coordinates on a document at which desired information can be extracted such as account information, billing value, customer address, customer ID, etc.

The approach of the present system to modeling a document management application capitalizes on the benefits of general direct manipulation interfaces. The present system reduces the need for additional runtime aspects necessary to execute the document management application by generating valid required inputs and uploading them automatically to the runtime application. The use of the present system further results in a set of reusable assets for the domain of the document management applications.

The present system generates a model that reflects the variable aspects of a document management application. The present system further generates and deploys one or more runtime artifacts for each instance of the model. The present system unifies an object oriented, structured programming language such as JAVA with XML and UML technologies to build integrated software tools.

The present system comprises a code generation module, a business process file wizard, an editor, a model and an adapter. From a model specification in XML generated by the present system, the present system provides tools and runtime support to produce a set of JAVA classes for the model, a set of adapter classes that enable viewing and command-based editing of the model, and a basic editor. The model can be specified using annotated JAVA, XML documents, or modeling tools. The model can be exported to a document management application system. Modifying the model can be achieved by editing the model or generating a new model external to the document management application system. Further, a user can modify the model while the document management application system is operating without changing any portion of the document management application system, shutting down the document management application system, or rebooting the document management application system.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 7 is a diagram of an exemplary representation of an exemplary loan process generated by the business process file generator of FIGS. 1 and 4.

DETAILED DESCRIPTION OF PREFERRED EMBODIMENTS

Figure 1:
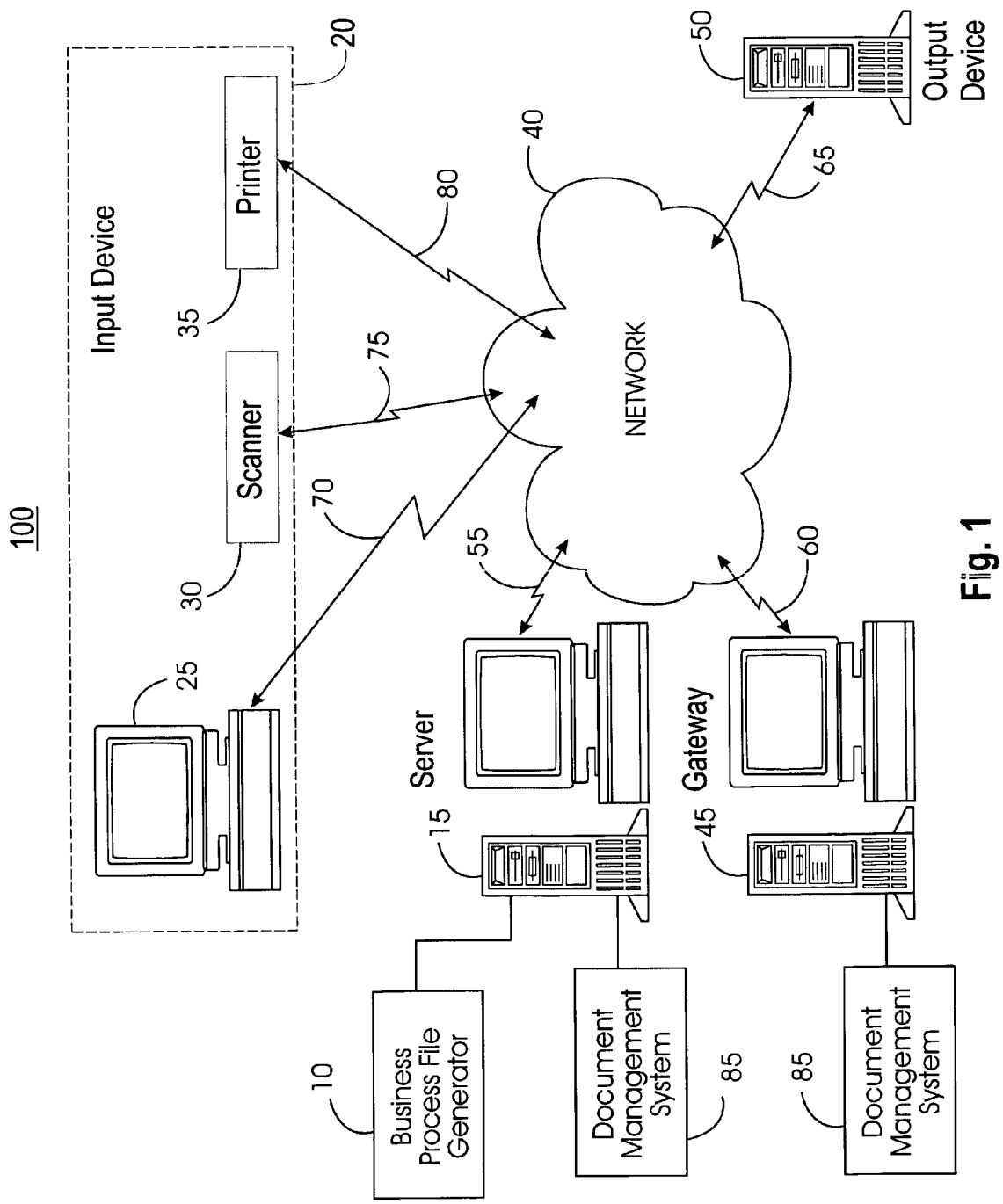
FIG. 1 is a schematic illustration of an exemplary operating environment in which a business process file generator of the present invention can be used.

FIG. 1 portrays an exemplary overall environment (the "content management system 100") in which a system, computer program product, and associated method (the business process file generator 10, or "system 10") for defining and generating document management applications for model-driven document management according to the present invention may be used. System 10 comprises a software programming code or a computer program product that is typically embedded within, or installed a server 15.

Alternatively, system 10 can be saved on a suitable storage medium such as a diskette, a CD, a hard drive, or like devices. While system 10 is referenced in terms of documents, system 10 can be used to model any type or form that can be electronically transmitted, processed, and stored, such as, for example, paper or electronic documents, photographs, video recordings, audio recordings, etc. Further, while system 10 is shown as part of the content management system 100, system 10 can be operated on a stand-alone computer; business process files generated by system 10 can be imported into the content management system 100.

An input device 20 is represented by a variety of devices such as, for example, a computer 25, a scanner 30, or a printer 35. The input device 20 is any type of content capture device that can input content to the content management system 100. Users can input documents, images, video, audio, etc. into the content management system 100 by means of the input device 20. The input device 20 can access server 15 through a network 40. A gateway 45 accesses server 15 and an output device 50 through network 40.

The input device 20, server 15, gateway 45, and the output device 50 each comprise software that allows a secure interface over network 40. Server 15, gateway 45, and the output device 50 are each connected to network 40 via a communications link 55, 60, 65, respectively. The communications link 55, 60, 65 comprises links such as a telephone, cable, or satellite link. The input device 20 can be connected to network 40 via communications links such as a telephone, cable, or satellite link. Computer 25, scanner 30, and printer 35 are connected to network 40 via a communications link 70, 75, 80, respectively.

While system 10 is described in terms of network 40, the input device 20, server 15, gateway 45, and output device 50 may also communicate via a local area network, a wide area network, or any other network that allows communication between the input device 20, server 15, gateway 45, and output device 50. Furthermore, any one or more of the input device 20, server 15, gateway 45, or output device 50 may be co-located, communicating over a network such as, for example, a local area network while others of the input device 20, server 15, gateway 45, or the output device 50 are located remotely, connecting over a network such as, for example, the Internet.

Computer 25 functions as the input device 20 in the content management system 100. Computer 25 may otherwise function as a user interface with the content management system 100. A user may access documents for verification or review from a computer or other device as represented by computer 25.

Figure 2:
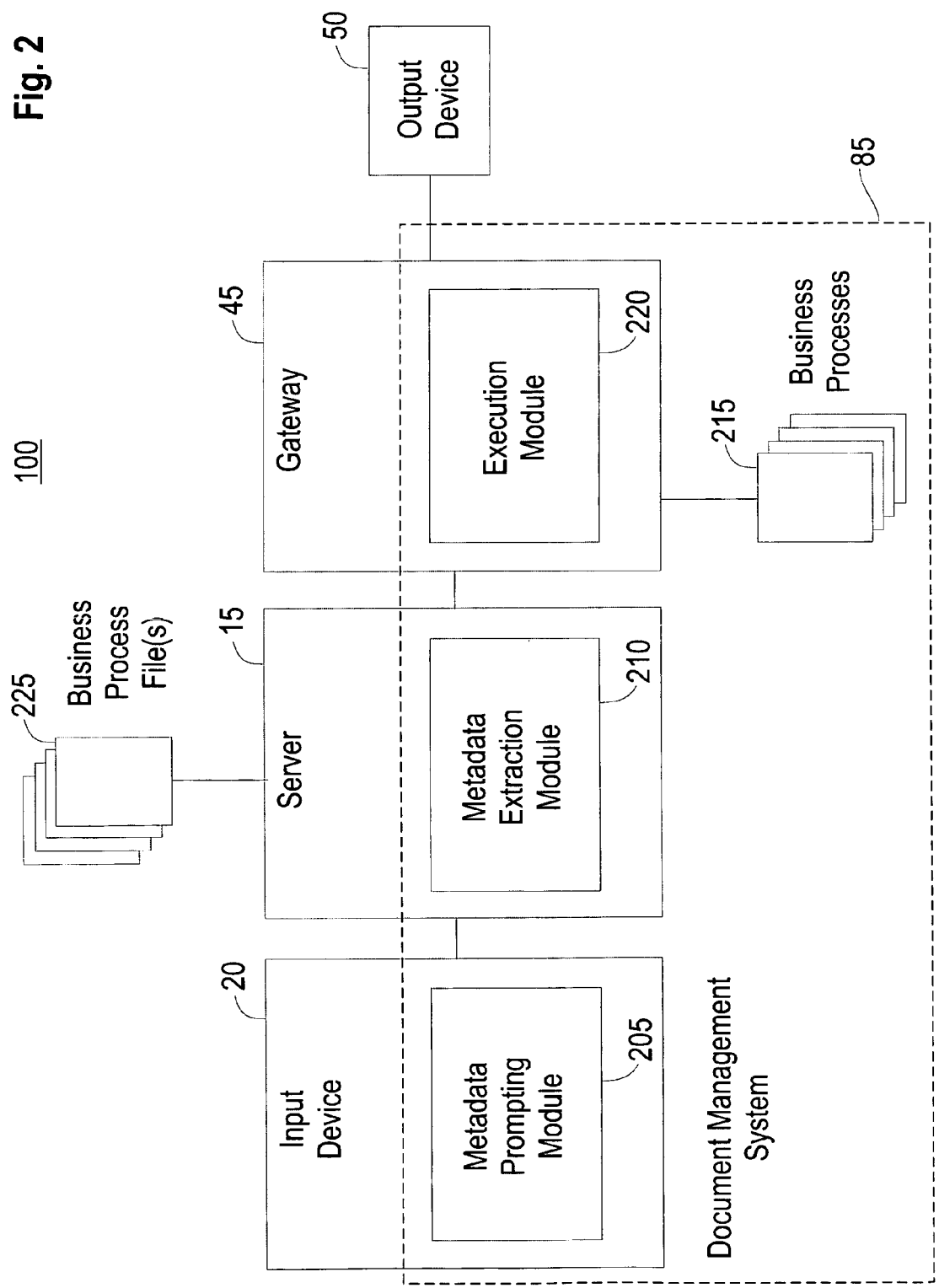
FIG. 2 is a block diagram of the high-level architecture of the exemplary operating environment in which the business process file generator of FIG. 1 can be used.

FIG. 2 illustrates a high-level hierarchy of a document management system 85. The document management system 85 comprises a metadata prompting module 205, a metadata extraction module 210, business processes 215, and an execution module 220. The metadata prompting module 205 is installed on the input device 20. As a user is inputting a document into the content management system 100 via the input device 20, the metadata prompting module 205 requests information about the document from the user through one or more prompts. These prompts may take the form of text, audio, video, etc.

The metadata extraction module 210 is installed on server 15. The metadata extraction module 210 automatically extracts metadata from the document using one or more business process files 225 generated by system 10. The business process files 225 inform the metadata extraction module 210 what information to extract from a document and location of the desired information on the document.

The execution module 220 is installed on gateway 45. The business processes 215, also installed on gateway 45, comprise instructions executed by the execution module 220. The execution module 220 retrieves the document and associated metadata from server 15. The execution module 220 analyzes the document and associated metadata to determine the document type and classify the document. The execution module 220 then selectively and automatically executes instructions in the business processes 220 on a document-by-document basis determined the document type and classification of the document.

Figure 3:
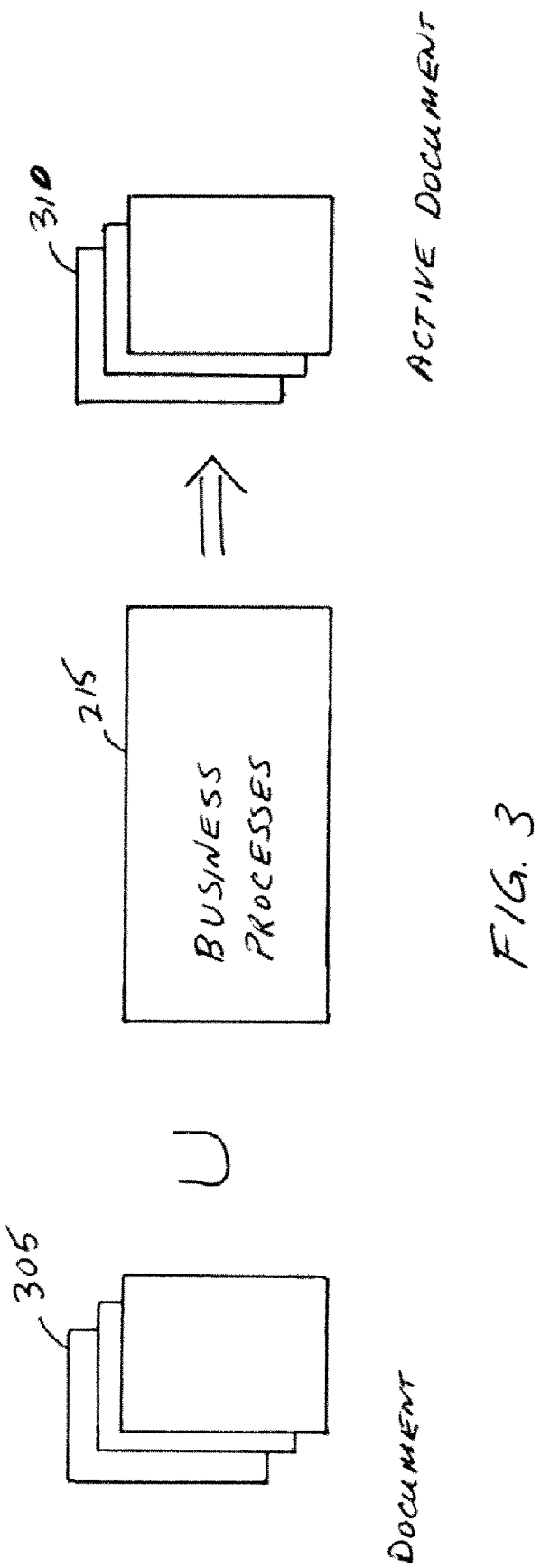
FIG. 3 is a high-level model of a an active document resulting from the business process file generator of FIG. 1.

FIG. 3 illustrates a high-level model of document flow through the content management system 100. A document 305 is entered into the content management system 100 via the input device 20. The content management system 100 deploys the document 305 to the server 15. The document 305 is unioned with the business process files 225 by the document management system 85 to generate an active document 310. The active document 310 is processed as instructed by the business processes 215 according to information obtained through the business process files 225.

Figure 4:
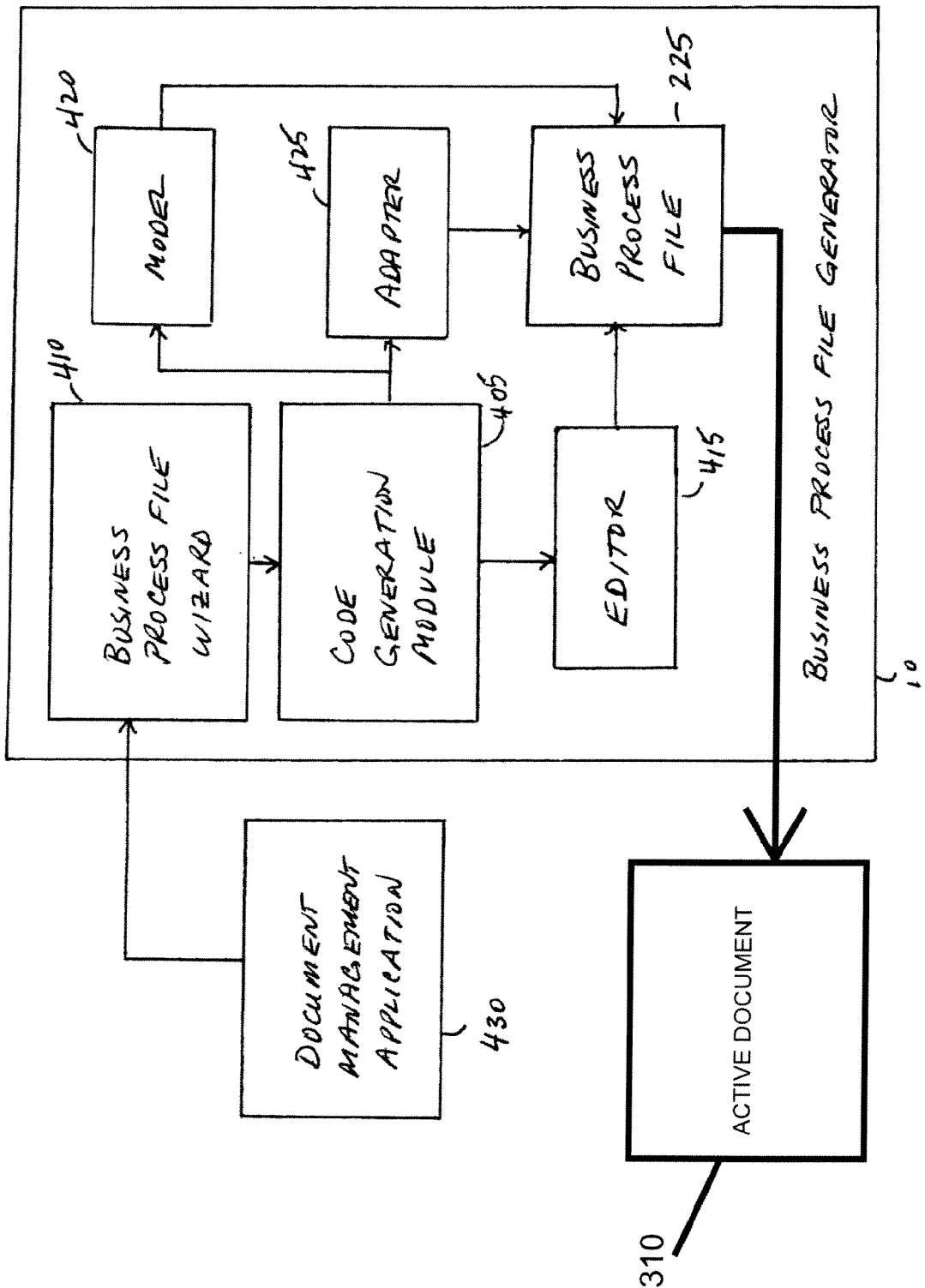
FIG. 4 is a block diagram of a high-level architecture of the business process file generator of FIG. 1.

FIG. 4 illustrates a high-level hierarchy of system 10. System 10 comprises a code generation module 405 and a business process file wizard 410. The code generation module 405 generates an editor 415, a model 420, and an adapter 425 to form the business process files 225. System 10 generates one or more of the business process files 225 for each document management application 430 processed by system 10. Model 420 provides interfaces and implementation classes for the classes in the business process files 225. Model 420 further provides a factory and a metadata package implementation class. The adapter 425 generates implementations classes that adapt the model classes for editing and display. The editor 415 allows an instance of model 420 to be created and edited.

Figure 5:
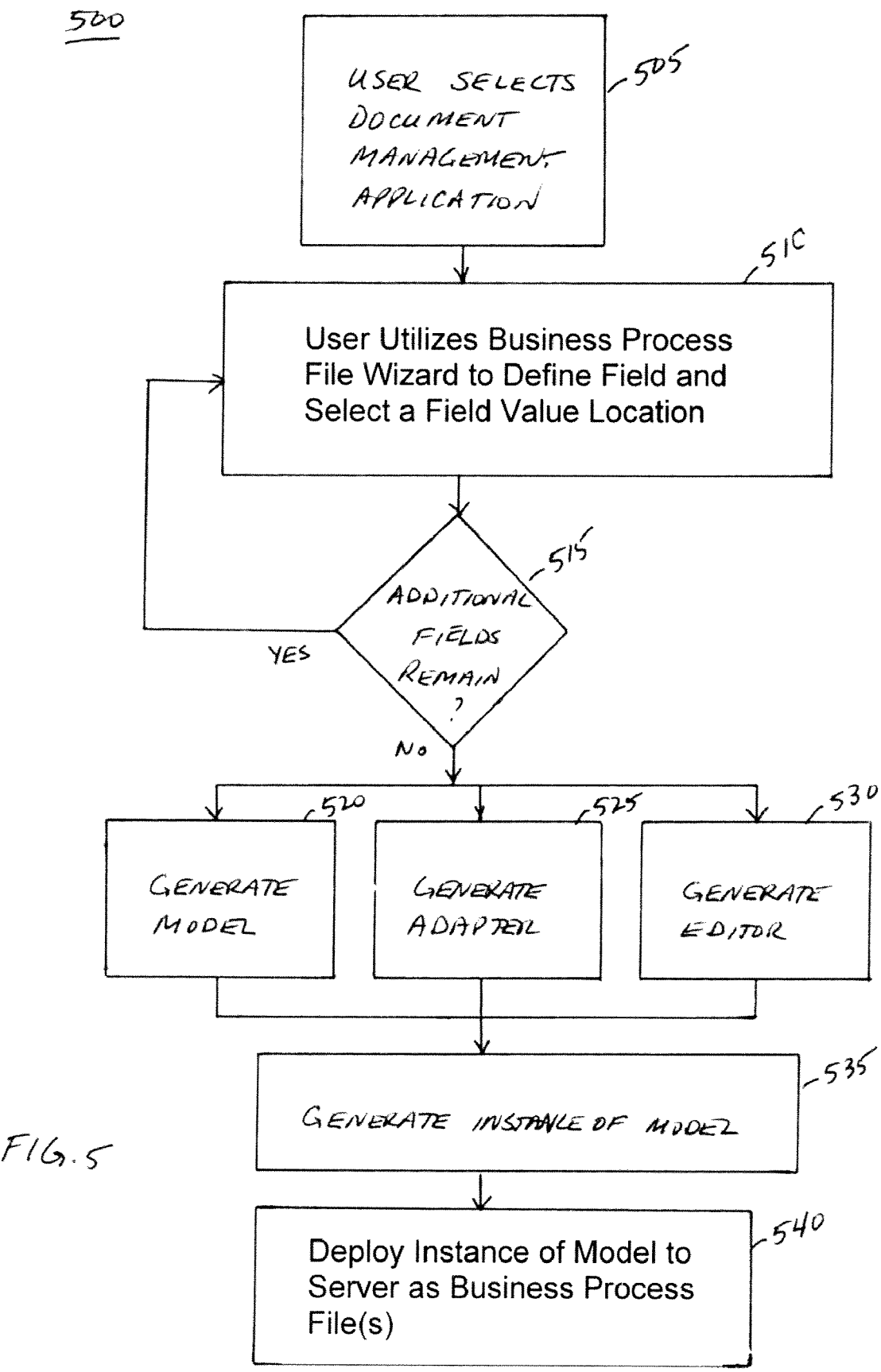
FIG. 5 is a process flow chart illustrating a method of operation of the business process file generator of FIGS. 1 and 4.

FIG. 5 illustrates a method 500 of system 10 in creating the business process files 225. A user selects a document management application 430 for processing (step 505). The user utilizes the business process file wizard 410 to define a field and select an area on the document management application 430 in which a value of the defined field is located (step 510). The selected fields are the variable aspects of the document management application 40 that are processed by the document management system 85.

The user determines whether additional fields remain for definition (decision step 515). If yes, the user repeats step 510. When the desired fields have been defined and located, the code generation module 405 generates model 420 (step 520), the adapter 425 (step 525), and the editor 415 (step 530). Step 520, step 525, and step 530 essentially occur concurrently and in no particular order. System 10 uses model 420, the adapter 425, and the editor 415 to generate an instance of the model (step 535). System 10 deploys the instance of model 420 as a business process file 225 to the server 15 for use by the document management system 85 (step 540).

Each instance of model 420 is a business process file 225 that represents a specific document management application and generates the code and other runtime artifacts necessary for the specific document management application. Deployment of the code and the runtime artifacts into a runtime environment on server 15 results in a new business process file 225.

System 10 generates the artifacts required at runtime from the information stored in model 420, providing the user a consistent experience when designing a business process file 225 independent of required data sources, documents, repositories, or notifications.

System 10 generates the following artifacts: gateway-config.xml, Businessprocess.xml, <Process Name>.xdd, <Process Name>.xml, and <Process Name>.html. The server 15 uses the artifact gateway-config.xml to configure settings for the server 15. The artifact gateway-config.xml stores information such as the data source and repository used for the modeled document. The repository information specifies which adaptor 425 to use.

System 10 uses the artifact Businessprocess.xml to configure settings for the document management process. The artifact Businessprocess.xml holds information such as, for example, which documents belong to the document management process and which notifications are to be executed.

System 10 uses <Process Name>.xdd to specify a user for the input device 20. The <Process Name>.xdd specifies optical character recognition actions and the file formats used by the input device 20. The user interface is auto-generated by system 10 such that the user is not required to learn a scripting language. This <Process Name>.xdd is generated if the document comprises an image.

Server 15 uses <Process Name>.xml to determine which XML entries to read. The <Process Name>.xml is generated if the document comprises XML.

System 10 generates <Process Name>.html from information provided in the process of generating model 420. The <Process Name>.html comprises documentation, making the process of generating model 420 self-documenting.

Figure 6:
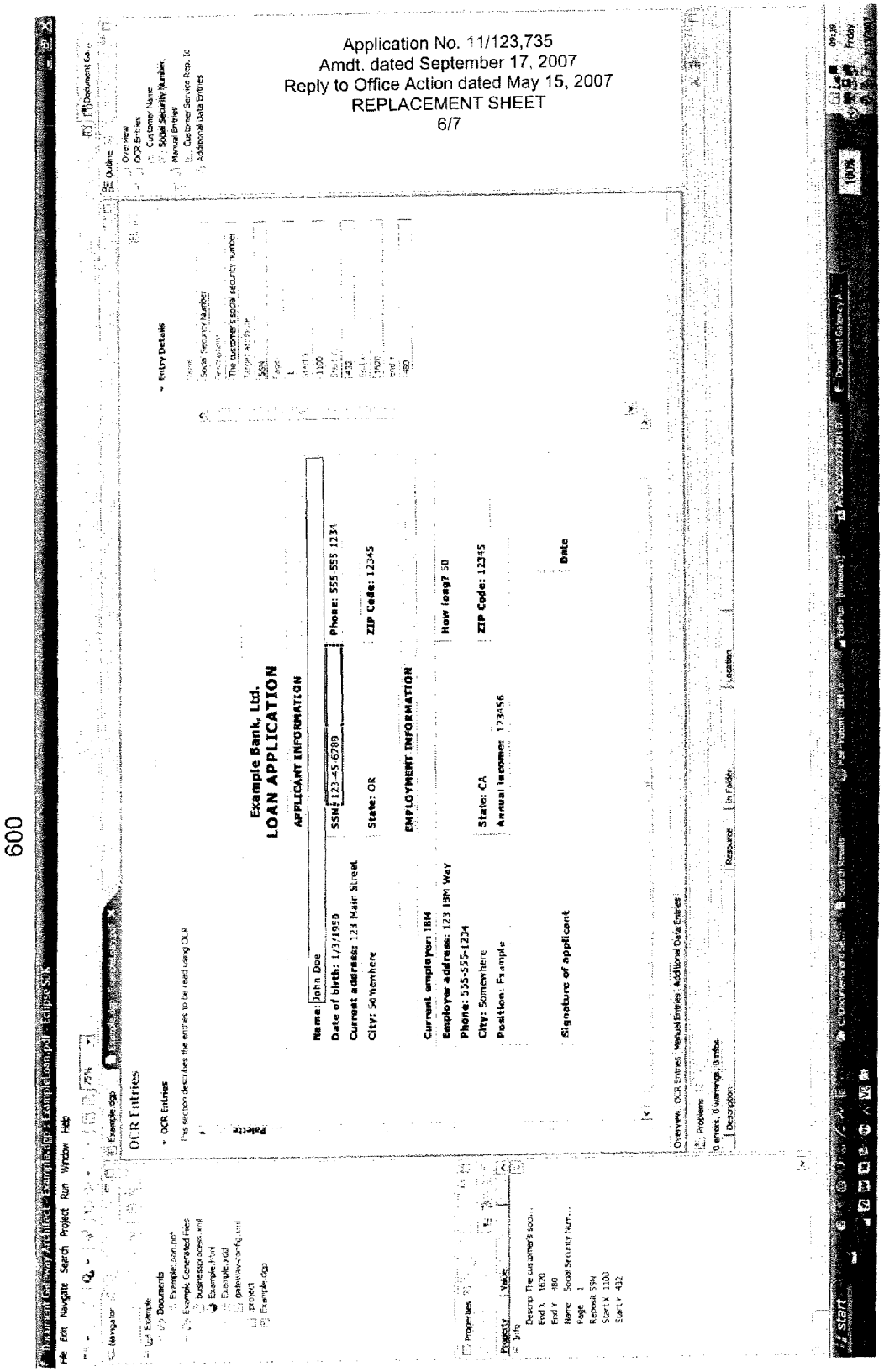
FIG. 6 is a diagram of an exemplary interface generated by the business process file generator of FIGS. 1 and 4.

The following example illustrates generation of one or more business process files 225 for an exemplary document management application, a simplified loan application document. A user selects the business process file wizard 410 to create a project for the process of generating the business process files 225. This business process file wizard 410 generates the project, a folder for the documents, and the business process files 225. An exemplary user interface 600 for the business process file wizard 410 is illustrated in FIG. 6.

The user (a business process file designer) directs system 10 to import a sample of the loan application document. This example assumes the user has a PDF file of the loan application. The user selects a server settings tab in the process editor of the user interface 600 and configures the information on the runtime environment such as, for example, which type of repository stores the documents, what type of authentication is required, etc.

The user selects a documents tab of the user interface 600 and adds the sample loan application, associating the loan application document with the process of generating the business process files 225 for the loan application document. The user opens the process document editor of the user interface 600 and configures the general setting of the user interface 600 for the loan application document. The general settings comprise, for example, a display name for the loan application document and a repository target. For example, if the repository is a database, the user may specify a table in the repository as the repository target.

The user configures the entries. The process editor of the user interface 600 presents different tabs for selection by the user depending on the types of entries supported by the document being processed. For example, the user interface 600 comprises an OCR entry tab, a manual entry tab, and an additional data entry tab for an image document. OCR entries are entries that are read using optical character recognition. A document submitter is prompted for manual entries when a document is acquired by the content management system 100. Verifiers use additional data entries to enter additional comments on a document.

Figure 7:
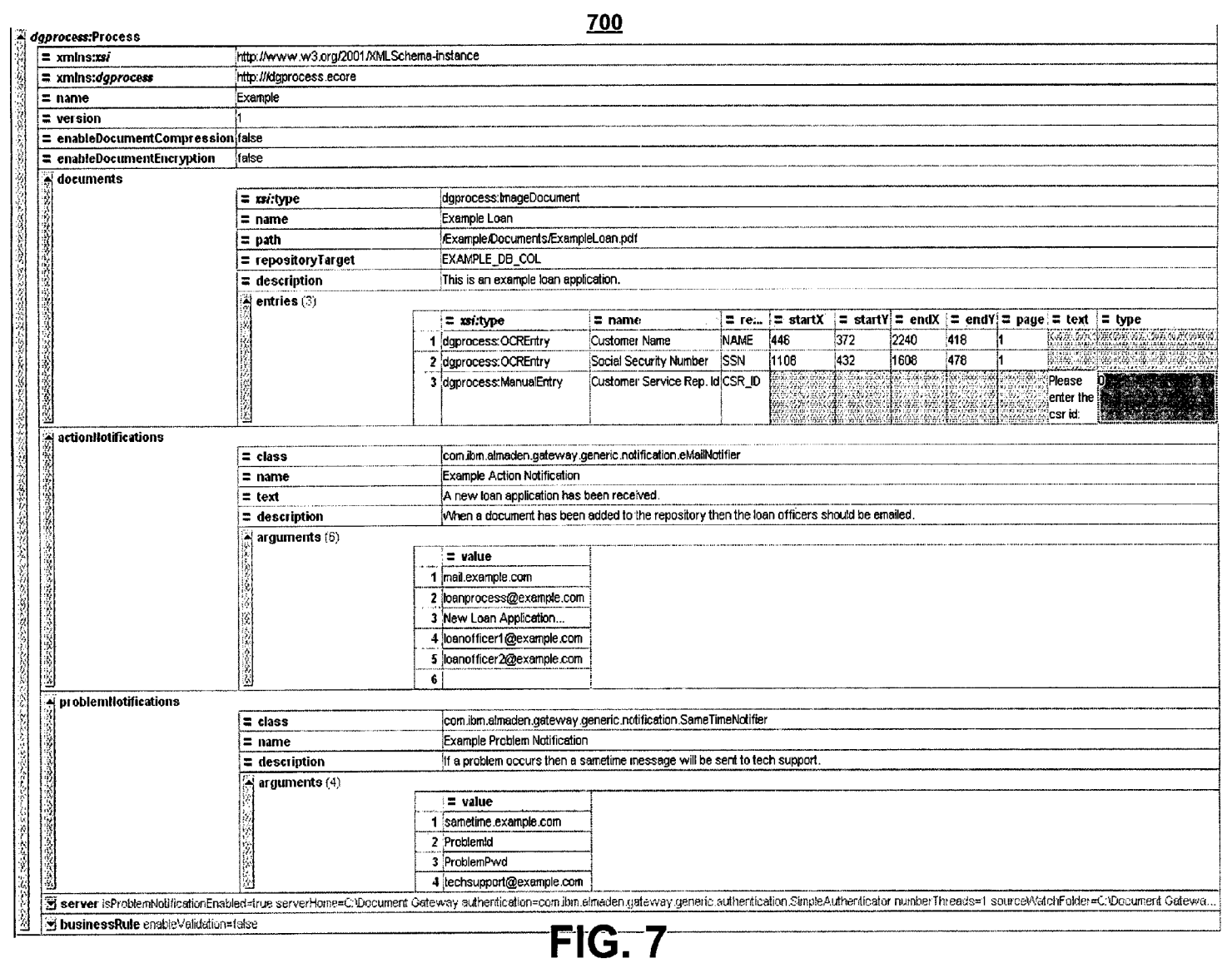

The user specifies the notifications to be sent. The business process files 225 are now ready to be deployed to the server 15. The user can deploy the process from system 10 to the runtime environment of system 10 to observe operation of the business process files 225. System 10 saves the business process files 225 as an XML document. Consequently, this allows sharing of the business process files 225. FIG. 7 illustrates an XML representation 700 of the example loan process described above.

At runtime, the server 15 reads the artifacts generated by system 10 to determine the execution logic of the business process files 225. The following example shows the execution for a process in which the input device 20 is a Multi-Function Device, the business process file comprises one verification and one action notification, and the repository is a database.

The following example illustrates a simplified process for a loan application. A bank branch employee arrives at a multi-function device (input device 20) and places the loan application document on the device. The employee selects a document type from a list of options (as generated by system 10). Based on the document type, the employee is prompted to enter an employee id number since, for example, the business process files designer wishes to track the number of applications per employee.

The loan application is scanned, optical character recognition is performed (based on the fields selected by the process designer in system 10), and the data is sent to gateway 45. Gateway 45 reads the data and identifies the document type. Based on the document type, gateway 45 sends an email to a customer service representative requesting verification of the document data. The email comprises a link to the portal where the data can be verified.

A customer service representative receives the email, logs into the portal, and verifies that the data is correct. For comparison purposes, the customer service representative has access to the interpreted data as well as the captured image. After the data is verified, the gateway 45 performs several business rules to determine which loan officer is assigned. For example, the choice of loan officer may depend on workload of the loan officer, geography, whether the customer is a preferred customer, etc. The gateway 45 issues a notification to the loan officer that a new application has been received.

System 10 allows easy modification of the business process files 225. For example, additional sources can be added to allow electronically generated loan applications (i.e. from bank employees, the internet, or affiliates), additional rules can be added to define document routing, additional notifications can be added to allow users to be notified in different ways, etc. For example, a loan officer can be contacted via instant messaging if the loan application is from a preferred customer. Modifications can be made to the business process files 225 using system 10; system 10 then generates the implementing code.

It is to be understood that the specific embodiments of the invention that have been described are merely illustrative of certain applications of the principle of the present invention. Numerous modifications may be made to the system and method for defining and generating document management applications for model-driven document management described herein without departing from the spirit and scope of the present invention.

What is claimed is:

1. A method of creating business process files comprising:
   selecting a document management application for processing;
   selecting a set of documents to be processed by the document management application;
   utilizing a business process file wizard that defines one or more fields in the document management application; said business process file wizard configured to generate business process files with at least one verification action and at least one notification action;
   presenting to a user different tabs for selection by the user; said selection responsive to types of entries supported by the set of documents to be processed;
   requesting from the user verification of at least one document from the set of documents to be processed;
   prompting the user for manual entries to enter additional comments on the set of documents to be processed;
   accepting from the user information of notifications to be sent;
   generating a model for each document in the set of documents processed;
   using an editor to generate an instance of the model;
   where the instance contains only elements relevant to the selected document management application;
   where the editor supports instantiation of a model for each document management application;
   identifying an area in the document management application in which a value of a defined field is located;
   processing selected fields with the document management application;
   generating a first file for information related to source and storage of at least one document from the set of documents,
   generating a second file for configuring settings of the document management application;
   generating a third file for specifying optical character recognition and file format used by an input device of the at least one document from the set of documents;
   generating a fourth file for documenting creation of the business process files; and
   generating additional implementation code corresponding to the business process files, if the user makes changes to the business process files, where changes to the business process files are made by generating a new model of the document to be changed.

2. The method of claim 1 wherein the set of documents comprises XML documents.

3. The method of claim 2 further comprising generating an XSL code with XPATH expressions for the set of XML documents, prior to the step of utilizing the business process file wizard.

4. The method of claim 2, further comprising generating a user interface that prompts a user for metadata associated with the XML document.

5. The method of claim 1, further comprising generating a custom business logic based on user specifications of business rules.

6. The method of claim 1, further comprising generating user specifications that determine whether additional fields remain for definition.

7. The method of claim 1, further comprising generating a model providing interfaces and implementation classes for classes in the business process files.

8. The method of claim 7 further comprising creating an instance of the model in the document management application.

9. The method of claim 1, wherein the selected set of documents are inputted in any one of: a scanned document form; or an electronic document form.

10. The method of claim 8 wherein the instance of the model is deployed to a server as a business process file.

* * * * *